United States Patent
Rath et al.

(10) Patent No.: US 9,689,568 B2
(45) Date of Patent: Jun. 27, 2017

(54) ADJUSTABLE DIVISION PLATE FOR CLASSIFIER COAL FLOW CONTROL

(71) Applicant: Babcock Power Services, Inc., Worcester, MA (US)

(72) Inventors: John Rath, West Pawlet, VT (US); Murat Yaldizli, Revere, MA (US)

(73) Assignee: Babcock Power Services, Inc., Worcester, MA (US)

( * ) Notice: Subject to any disclaimer, the term of this patent is extended or adjusted under 35 U.S.C. 154(b) by 313 days.

(21) Appl. No.: 14/371,951

(22) PCT Filed: Jan. 11, 2013

(86) PCT No.: PCT/US2013/021257
§ 371 (c)(1),
(2) Date: Jul. 11, 2014

(87) PCT Pub. No.: WO2013/106727
PCT Pub. Date: Jul. 18, 2013

(65) Prior Publication Data
US 2015/0056024 A1    Feb. 26, 2015

Related U.S. Application Data

(60) Provisional application No. 61/586,197, filed on Jan. 13, 2012.

(51) Int. Cl.
*B65G 53/38* (2006.01)
*F23K 3/02* (2006.01)
(Continued)

(52) U.S. Cl.
CPC .............. *F23K 3/02* (2013.01); *B65G 53/04* (2013.01); *B65G 53/528* (2013.01);
(Continued)

(58) Field of Classification Search
CPC ..... B65G 53/38; B65G 53/526; B65G 53/528
(Continued)

(56) References Cited

U.S. PATENT DOCUMENTS 1,805,940 A * 5/1931 Dolan .................. B65G 53/521
406/181
3,265,327 A * 8/1966 Mach ..................... B65G 51/24
406/182

(Continued)

FOREIGN PATENT DOCUMENTS

JP          63-271019 A    11/1998

OTHER PUBLICATIONS

PCT International Search Report dated Apr. 23, 2013 issued on corresponding PCT International Application No. PCT/US2013/021257.

*Primary Examiner* — Joseph Dillon, Jr.
(74) *Attorney, Agent, or Firm* — Locke Lorde LLP; Joshua L. Jones; Alicia J. Carroll

(57) ABSTRACT

A solid particle distribution controller includes a plurality of division plates proximate a division between an upstream solid particle conveyance pipe and a plurality of downstream pipes. The solid particle distribution controller also includes a plurality of extension plates. Each of the extension plates is movably mounted proximate to a respective division plate for movement in an upstream and downstream direction with respect to the division plate. The plurality of extension plates are configured and adapted for motion in the upstream and downstream direction independent of one another to extend upstream of the division plates as needed to improve solid particle distribution among the downstream pipes.

7 Claims, 3 Drawing Sheets

(51) Int. Cl.
*B65G 53/04* (2006.01)
*B65G 53/52* (2006.01)

(52) U.S. Cl.
CPC ...... *F23K 2201/10* (2013.01); *F23K 2201/30* (2013.01); *F23K 2203/006* (2013.01); *F23K 2203/104* (2013.01); *F23K 2203/105* (2013.01); *F23K 2203/201* (2013.01); *Y10T 29/49716* (2015.01)

(58) Field of Classification Search
USPC ....... 406/181, 182; 137/561 A, 874; 111/175
See application file for complete search history.

(56) References Cited

U.S. PATENT DOCUMENTS

| | | | | |
|---|---|---|---|---|
| 3,685,166 | A * | 8/1972 | Fitton | B01J 6/00 34/168 |
| 3,691,644 | A * | 9/1972 | Schnitzer | F26B 3/08 34/365 |
| 3,763,884 | A * | 10/1973 | Grassi | F24F 11/047 137/504 |
| 3,915,222 | A * | 10/1975 | Hull | F02C 7/08 165/111 |
| 4,284,243 | A * | 8/1981 | Shaner | A01C 23/023 111/119 |
| 4,512,368 | A * | 4/1985 | Kaminaka | B65G 53/528 137/561 A |
| 5,101,847 | A * | 4/1992 | Oribe | F24F 7/06 137/1 |
| 5,265,547 | A * | 11/1993 | Daws | A01C 7/087 111/175 |
| 5,934,205 | A | 8/1999 | Gordon et al. | |
| 6,220,793 | B1 * | 4/2001 | Meyer | D01G 23/08 137/872 |
| 6,234,090 | B1 | 5/2001 | Wark et al. | |
| 6,811,358 | B2 * | 11/2004 | Bauver | B65G 53/528 406/113 |
| 7,785,043 | B2 * | 8/2010 | Elsen | F16L 55/1018 251/212 |
| 8,136,746 | B2 * | 3/2012 | Martin | B02C 23/32 241/119 |
| 8,403,602 | B2 * | 3/2013 | Zarnescu | F23K 3/00 110/101 R |
| 8,690,488 | B2 * | 4/2014 | Jagow | A01C 7/082 111/175 |
| 8,784,013 | B2 * | 7/2014 | Watson | B65G 53/56 137/561 A |
| 9,162,256 | B2 * | 10/2015 | Baetz | B07B 7/083 |
| 2007/0095260 | A1 | 5/2007 | John | |
| 2008/0047700 | A1 * | 2/2008 | Fowser | F23L 15/00 165/166 |
| 2009/0165686 | A1 * | 7/2009 | Memory | A01C 7/082 111/175 |
| 2010/0154689 | A1 | 6/2010 | Adam et al. | |
| 2010/0236225 | A1 * | 9/2010 | Wahl | F01N 3/2066 60/301 |
| 2015/0083230 | A1 * | 3/2015 | Ganzer | F17D 1/088 137/13 |
| 2015/0241058 | A1 * | 8/2015 | Mine | F23D 1/00 110/261 |

* cited by examiner

ADJUSTABLE DIVISION PLATE FOR CLASSIFIER COAL FLOW CONTROL

CROSS-REFERENCE TO RELATED APPLICATIONS

This application is a National Phase application filed under 35 USC 371 of PCT International Application No. PCT/US2013/021257 with an International Filing Date of Jan. 11, 2013, which claims priority to U.S. Provisional Patent Application No. 61/586,197 filed Jan. 13, 2012. The disclosures of each of the aforementioned patent applications are incorporated by reference herein in their entirety.

BACKGROUND OF THE INVENTION

1. Field of the Invention

The present invention relates to systems for conveying solid particles through gas flows, and more particularly to coal pulverizer (mill) discharge piping systems wherein coal particles are conveyed through air flows.

2. Description of Related Art

In coal combustion systems, coal and primary air (PA) flow distribution between burner lines is important for optimizing combustion and burner performance. Low $NO_X$ burner design usually requires that coal mass flow imbalance between coal pipes should be within +/−15% deviation from the mean value, or lower, to ensure burner performance. Imbalanced coal flow between coal pipes also negatively impacts combustion efficiency, as indicated by unburned carbon (UBC), heat rate, heat balance etc., as well as gaseous emissions such as $NO_X$, CO, etc. Orifices (fixed or variable) installed in the coal pipes for PA (primary air) flow adjustment are unable to correct the coal flow imbalance without having adverse effects on the PA flow distribution, when this imbalance is a result of uneven coal flow discharged from an upstream classifier.

To resolve the coal flow distribution shortcomings in the art, there exists a need in the art for a coal flow distribution system that provides a tool to correct particle flow distribution between coal pipes. There also remains a need in the art for such a system that has little or no negative impact on PA flow distribution between coal pipes. The present invention provides a solution for these problems.

SUMMARY OF THE INVENTION

The subject invention is directed to a new and useful solid particle flow distribution controller. The solid particle distribution controller includes a plurality of division plates proximate a division between an upstream solid particle conveyance pipe and a plurality of downstream pipes. The solid particle distribution controller also includes a plurality of extension plates. Each of the extension plates is movably mounted proximate to a respective division plate for movement in an upstream and downstream direction with respect to the division plate. The plurality of extension plates are configured and adapted for motion in the upstream and downstream direction independent of one another to extend upstream of the division plates as needed to improve solid particle distribution among the downstream pipes.

In accordance with certain embodiments the extension plates can be mounted to their respective division plates by way of tracks configured to guide movement of the extension plates. Each extension plate can be operatively connected to an actuator for moving the extension plate. Any suitable type of actuator or actuators can be used, such as manual actuators, electrical actuators, pneumatic actuators, or hydraulic actuators, for example.

In certain embodiments, the solid particle flow distribution controller can also include a coal classifier having an inlet and a discharge skirt having a plurality of outlets. The division plates can be mounted within the interior of the discharge skirt proximate an upstream portion of the plurality of outlets. The extension plates can be radially inward of the discharge skirt. The discharge skirt can also have an interior divided into a plurality of circumferentially segmented chambers by the division plates mounted within the discharge skirt for dividing flow from the inlet to a plurality of outlet pipes downstream of the coal classifier. The extension plates can be configured to move in the upstream and downstream direction independent of one another to extend upstream of their respective division plates as needed to improve coal particle distribution between the outlets and chambers of the discharge skirt. A feed pipe can extend through the coal classifier along a centerline thereof. A center pipe can be mounted within the classifier for control of an adjustable return baffle for prevention of reverse air flow through the classifier or re-entrainment of coarse particles.

The invention also provides a method of controlling solid particle flow in each pipe of a solid particle piping system. The method includes adjusting one or more of the positions of the extension plates of a solid particle flow distribution controller as described above to change solid particle flow and mass flow distribution among a plurality of downstream pipes. The method can improve coal particle distribution with little or no negative effect on PA (primary air) flow.

In certain embodiments, the solid particle piping system can be a coal piping system, wherein the downstream pipes are burner pipes operatively associated with a plurality of coal burners. It is also contemplated that the method can include moving one or more of the extension plates to a position to optimize air-to-coal ratios in individual burners, and/or to a position shifting fuel distribution to control steam temperature and/or boiler surface metal temperature in regions of a furnace in a boiler. The method can also include moving the extension plates to a position shifting fuel distribution to decrease fuel flow to oxygen-starved regions of a furnace to reduce carbon monoxide emissions. The extension plates can be adjusted with a coal classifier off-line or on line supplying coal to the burner pipes. Air flow distribution among the burner pipes can be controlled using external orifices in fluid communication with the burner pipes. Adjusting one or more positions of the extension plates can include controlling at least one of overall burner air-to-coal ratio for the burners, controlling flyash unburned carbon, and/or controlling loss on ignition. Air or a gas other than air can be used to convey coal particles through the solid particle flow distribution controller.

The invention also provides a method of retrofitting a solid particle classifier. The method includes installing a plurality of extension plates proximate a respective division plate in a solid particle classifier. The extension plates are configured as described above. In accordance with certain embodiments, installing a plurality of extension plates can include replacing a portion of the classifier. Replacing a portion of the classifier can include replacing a discharge turret of the classifier. Installing a plurality of extension plates can include removing a portion of at least one of the division plates. In addition, installing a plurality of extension plates can include installing their respective division plates in a classifier that does not have preexisting division plates. Further, installing a plurality of extension plates can include installing components in the classifier through one or more openings such as doors, slots, pipe openings, or the like.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
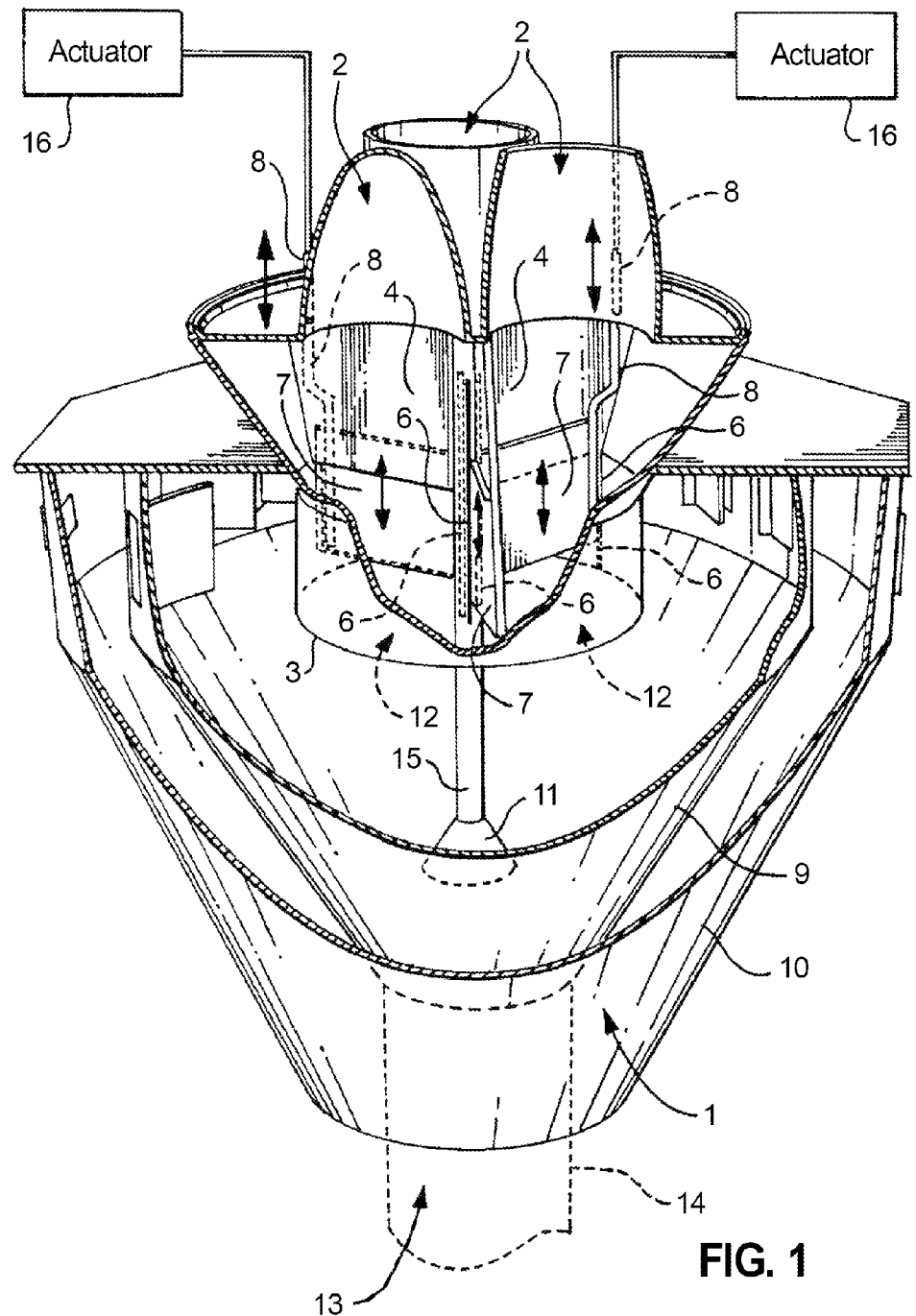
FIG. 1 is a cut away perspective view of an exemplary embodiment of a classifier constructed in accordance with the present invention, showing adjustable extension plates.

Reference will now be made to the drawings wherein like reference numerals identify similar structural features or aspects of the subject invention. For purposes of explanation and illustration, and not limitation, a partial view of an exemplary embodiment of a classifier in accordance with the invention is shown in FIG. 1 and is designated generally by reference character 1. Other embodiments of classifiers in accordance with the invention, or aspects thereof, are provided in FIGS. 2-3, as will be described. The systems and methods of the invention can be used, for example, on centrifugal type static classifiers to correct coal flow distribution with little or no negative impact on PA (primary air) flow distribution.

Classifier 1 provides for solid particle separation and flow correction in a solid particle conveyance system. Classifier 1 is shown by way of example as a coal particle classifier for classification of coal particles by removal of oversized particles and distribution of fine particles into multiple discharge pipes which in turn convey particles to burners in a multiple burner system. However, those skilled in the art will readily appreciate that any type of solid particle flow system can be used without departing from the spirit and scope of the invention. For example, the solid particle flow correction methods and devices described herein can readily be applied to non-coal substances such as limestone, cement, flyash, coke, and the like. Classifier 1 can be either static or dynamic, internal or external to the pulverizer, or can be a stand alone classifier.

For mill systems equipped with a classifier in accordance with classifier 1, the pulverized coal is discharged from classifier 1, via coal pipes 2, to a furnace downstream. Coal pipes 2 are connected to the top of classifier 1 (as oriented in FIG. 1). Within classifier 1, there is discharge turret and discharge skirt 3. Discharge skirt 3 has an interior divided into a plurality of circumferentially segmented chambers 12 by division plates 4 mounted within discharge skirt 3 for dividing flow from the inlet 13 to plurality of coal pipes 2 downstream of the coal classifier. There are three coal pipes 2 and three chambers 12 in discharge skirt 3 defined by division plates 4 shown in FIG. 1, however any suitable number of coal pipes, chambers, and division plates can be used without departing from the spirit and scope of the invention. The number of chambers 12 is equal to the number of coal pipes 2 from classifier 1. Each chamber 12 is connected to a respective one of individual coal pipes 2.

Figure 3:
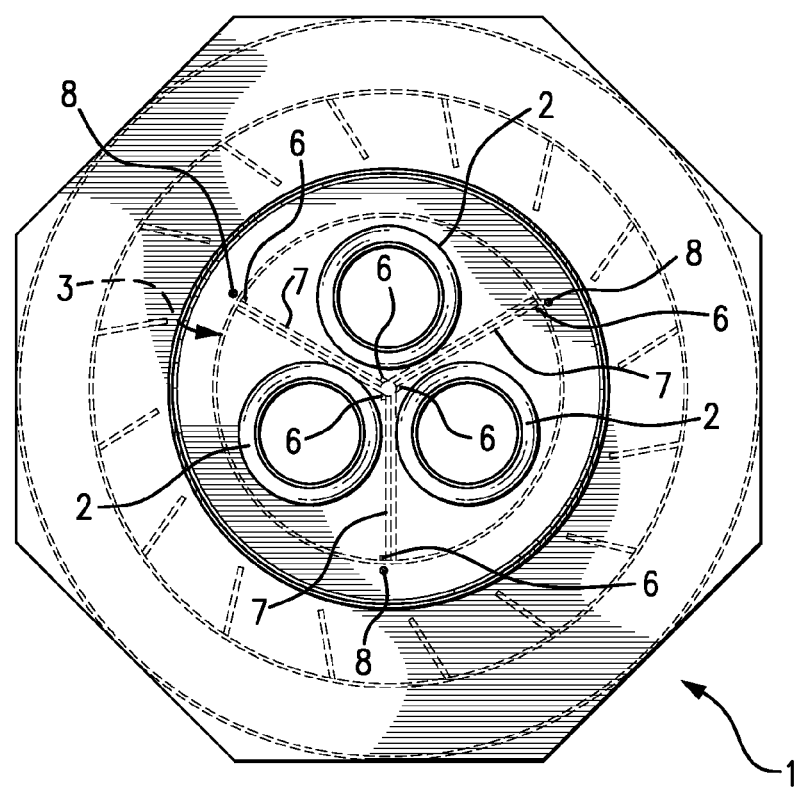
FIG. 3 is a plan view of the classifier of FIG. 1, showing the outlets of the classifier viewed from above as oriented in FIG. 1.

The solid particle distribution controller includes a plurality of division plates 4 proximate a division between an upstream solid particle conveyance pipe, e.g., inner cone 9, and a plurality of downstream pipes, e.g., coal pipes 2, and a plurality of extension plates 7. There is one extension plate 7 corresponding to each division plate 4. However, it is contemplated that there can be any suitable number of extension plates 7. As oriented in FIG. 1, each extension plate 7 is movably mounted proximate its respective division plate 4 for movement in an upstream and downstream direction with respect to division plate 4. Although extension plates 7, as shown in the perspective view of FIG. 1 and top view of FIG. 3, are shown as being mounted to the clockwise side of their respective division plates 4, those skilled in the art will readily appreciate that mounting extension plates 7 the counter-clockwise sides of division plates 4 would be advantageous to avoid flow going between an extension plate 7 and its respective division plate 4; they would also readily appreciate that extension plates 7 could be mounted on both sides of division plates 4, or suitable variations thereof.

Extension plates 7 are configured and adapted for motion in the upstream and downstream direction independent of one another to extend upstream of division plates 4, changing the effective length of their respective division plate 4, as needed to improve solid particle distribution, e.g. coal, among downstream pipes 2.

Those having skill in the art will readily appreciate that extension plates 7 can be positioned individually at different elevation levels to achieve optimum coal flow distribution between the partitioned chambers and between coal pipes 2. By moving at least one extension plate 7 to change the effective length of its respective division plate 4, the point at which the fuel particle flow is divided changes. This affects the percentage of fuel that enters each chamber of discharge skirt 3. The total open area for airflow is not changed, and therefore very little, if any, change in pressure drop or airflow occurs as a result. Although all extension plates 7 are configured to be identical, it is also contemplated that the configuration, number and size (width and height), and shape can be different and non-identical, based on application requirements, to control coal flow more effectively and flexibly into the chambers.

Figure 2:
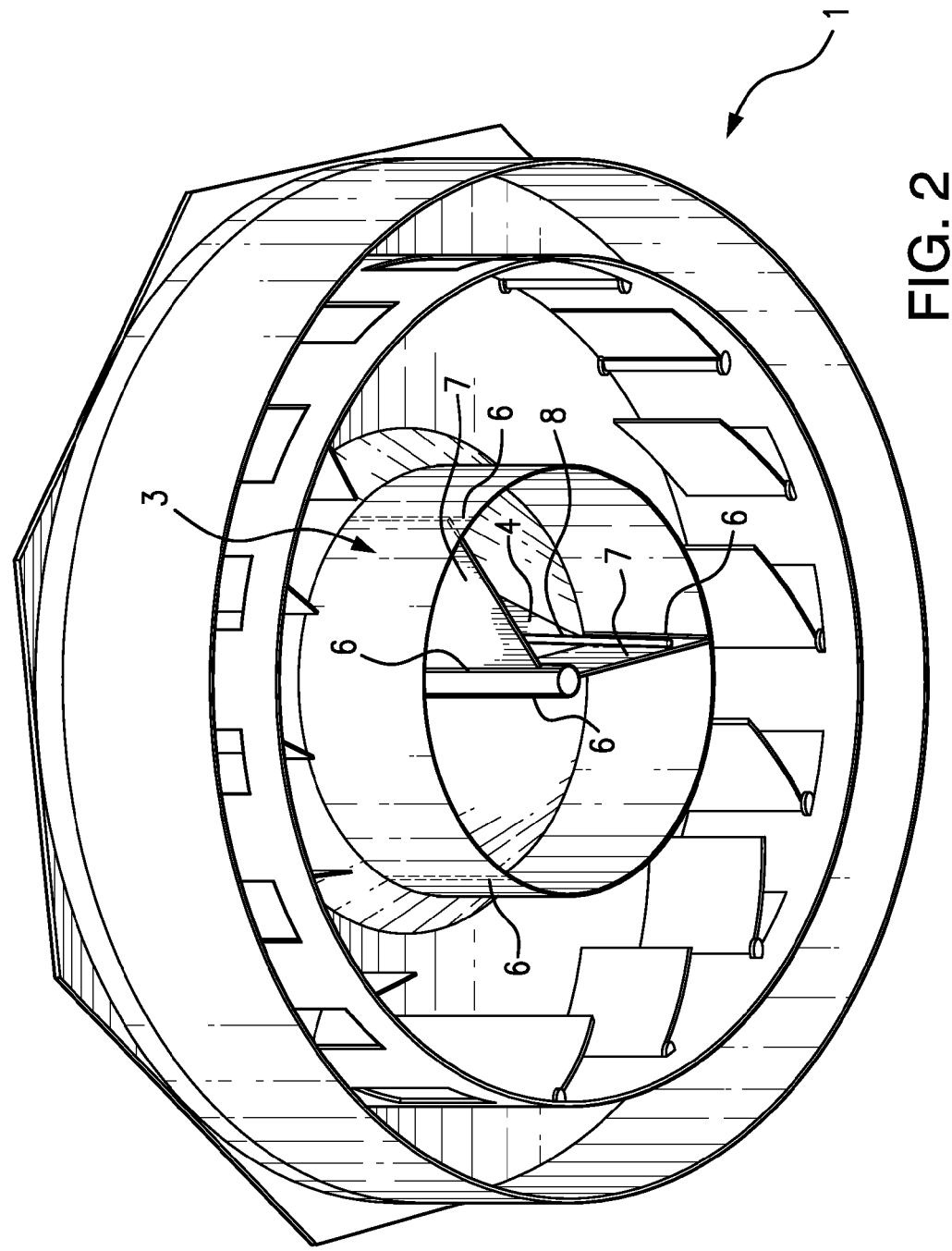
FIG. 2 is a perspective view of a portion of the classifier of FIG. 1, showing two of the three extension plates extended upstream of their respective division plates, one partially extended and the second fully extended.

Now with reference to FIGS. 1 and 2, extension plates 7 are mounted to their respective division plates 4 by way of tracks 6 configured to guide movement of extension plates 7. Tracks 6 are attached on the inner surface of division plates 4. Tracks 6 are optional, but are advantageous because they help guide extension plates 7 vertically and restrain them in the radial and circumferential directions. Those having skill in the art will readily appreciate that extension plates 7 can be moved individually manually or by hydraulics, mechanical actuators, or any other suitable type of actuator or method. An indicator of level position, such as a displacement sensor or the like, can be used for controlling the position of each extension plate 7. Control rods 8 are shown in FIGS. 1 and 3, each of which is mounted to a separate extension plate 7. Rods 8 extend outside of classifier 1, and can be manipulated manually, or can be connected to an actuator 16 as described above to move individual extension plates 7. The motion of some of rods 8 and extension plates 7 is indicated by the double pointed arrows in FIG. 1. Although rods 8 are shown in FIGS. 1-3 as being mounted to their respective extension plates 7 proximate the outer circumference of discharge skirt 3, those skilled in the art will readily appreciate that rods 8 can be mounted at any suitable position on extension plates 7, for example, rods 8 could be mounted to the center of their respective extension plate 7.

With reference now to FIG. 2, solid particle flow distribution controller is shown as a coal classifier 1 with inner and outer cones 9 and 10, shown in FIG. 1, removed to show some of divider and extension plates, 4 and 7, respectively. Two of the three extension plates 7 are shown extended upstream of their respective division plates 4, one partially extended, another fully extended. A third extension plate 7 is completely retracted downstream with respect to its division plate 4, and therefore, is not visible. Those having skill in the art will readily appreciate that extension plates 7 do not need to be in the same position with respect to one another and that the amount of extension in the upstream direction can vary between extension plates 7. Classifier 1 has an inlet 13 and discharge skirt 3, as described above, having a plurality of outlets, e.g. coal pipes 2. Division plates 4 are mounted within the interior of discharge skirt 3 proximate an upstream portion of plurality of outlets 2. Extension plates 7 are radially inward of discharge skirt 3 and are configured to move as described above as needed to improve coal particle distribution between the outlets and chambers of discharge skirt 3. A center pipe is mounted within the classifier for control of an adjustable return baffle 11 for prevention of reverse air flow through the classifier or re-entrainment of coarse particles.

Those having skill in the art will readily appreciate that for any given system, the positions of extension plates 7 can be adjusted individually to improve particle distribution among downstream pipes 2. These positions of extension plates 7 can be determined by computer and/or physical modeling for a given application, and/or by using measurements. The position of each extension plate 7 needed to improve coal distribution can be predicted through use of computational modeling techniques on an application to application basis. Manual or on-line measurements of coal particle distribution, unburned carbon (UBC), heat rate and/or gaseous emissions ($NO_X$, CO, etc.) can also be used as a basis for adjusting the position of extension plates 7.

Adjusting one or more positions of extension plates, e.g. extension plates 7, of a solid particle flow distribution controller as described above to change solid particle flow distribution among a plurality of downstream pipes, e.g. coal pipes 2, can improve coal particle distribution with little or no negative effect on PA flow. If the solid particle piping system is a coal piping system, as described in the exemplary embodiments above, the downstream pipes can be burner pipes operatively associated with a plurality of separate coal burners. Moving one or more of the extension plates to a proper position allows for optimization of air-to-coal ratios in individual burners, and/or shifting fuel distribution to control steam temperature and/or metal temperature of a boiler surface in a boiler. Extension plates can also be moved to shift fuel distribution, for example to decrease fuel flow to oxygen-starved regions of a furnace to reduce carbon monoxide emissions. Adjusting one or more positions of the extension plates can also be done to control overall burner air-to-coal ratio for the burners, to control flyash unburned carbon, and/or to control loss on ignition.

The positions of the extension plates can be adjusted whether the coal classifier, e.g. classifier 1, is off line or on line supplying coal to the burner pipes. Air flow distribution among the burner pipes can be controlled using external orifices in fluid communication with the burner pipes. Air or another suitable gas can be used to convey coal particles through the solid particle flow distribution controller.

A traditional solid particle classifier can be retrofitted to include extension plates as described above. This includes installing a plurality of extension plates as described above proximate a respective division plate in a solid particle classifier. This can include replacing portions of the existing classifier such as a discharge turret, and with a discharge turret including extension plates as described above. This replacement discharge turret can be a pre-fabricated unit, for example, that is simply installed after removal of a traditional turret. Installing a plurality of extension plates can also include removing a portion of at least one of the division plates, or adding division plates if none exist in a given classifier. It is also contemplated that installing a plurality of extension plates can include installing respective division plates in a classifier that previously did not have division plates. In addition, components such as the extension plates can be installed into the classifier through one or more openings such as doors, slots, pipe openings, or the like, without removing the existing turret.

While described above in the exemplary context of having one extension plate per division plate, those skilled in the art will readily appreciate that the number of extension plates can be less than, greater than, or equal to the number of division plates as appropriate for given applications. It is also contemplated that the devices and methods described herein can be used in conjunction with additional flow distribution devices internal to or external of the classifier for fine tuning adjustments of the classifier to further enhance coal balance and/or distribution. The control of the extension plate positions can be accomplished using software, neural net, distributed control systems (DCS), or the like for automated combustion control optimization.

If used with a classifier as described above, the classifier can be external to a pulverizer, internal to a pulverizer, such as within a vertical spindle mill, or can be completely separate, i.e., not connected to a pulverizer at all. The classifier can optionally have a coal feed pipe 14 extending through the centerline, such as if used in conjunction with any of the vertical roller, ball race, or bowl mill type vertical spindle pulverizer. The classifier can optionally have a center pipe 15 for control of an inverted cone, e.g., adjustable return baffle 11 of FIG. 1, for use in preventing reverse air flow through the classifier or re-entrainment of coarse particles. Optionally, the classifier can have nothing in the center, such as in side feed type systems. The components described herein can advantageously be fabricated of wear resistant material suitable for erosive and/or abrasive environments.

The methods and systems described above have been shown and described for use in a solid particle classifier, e.g. classifier 1. In a classifier, the air and particle flow velocity have a rotational component imparted by the angled vanes on the classifier, e.g. a swirling flow. The division plates, e.g. division plates 4, split this swirling flow trajectory (swirling about the center axis of the classifier). Therefore, by changing the effective length of the division plates with extension plates, e.g. extension plates 7, as described above, the quantity of particles sent in each direction can be changed. Those skilled in the art will readily appreciate the invention can also be provided in a stand-alone splitter, in which case the swirl can be imparted into the gas flow, for example, using swirl vanes, a tangential inlet, or the like.

The methods and systems described above have been shown and described in the exemplary context of coal piping systems. Those skilled in the art will readily appreciate that this is exemplary, and that the systems and methods of the invention can be applied in any suitable systems conveying particles through fluids, which benefit from uniform distribution between multiple discharge outlets such as in flow splitters. Moreover, it is also contemplated that the invention can be practiced on new systems, such as new classifiers, as well as on existing systems as in retrofitting existing classifiers, without departing from the spirit and scope of the invention.

The methods and systems of the present invention, as described above and shown in the drawings, provide for classifiers with superior properties including improved particle and PA distribution between downstream pipes. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A solid particle flow distribution controller comprising:
   a plurality of division plates proximate a division between an upstream solid particle conveyance pipe and a plurality of downstream pipes; and
   a plurality of extension plates, each of the extension plates movably mounted proximate to a respective division plate for movement in an upstream and downstream direction with respect to the division plate, wherein the plurality of extension plates are movably mounted for motion in the upstream and downstream direction independent of one another to extend upstream of the division plates to improve solid particle distribution among the downstream pipes.

2. A solid particle flow distribution controller as recited in claim 1, wherein the extension plates are mounted to their respective division plates by way of tracks configured to guide movement of the extension plates.

3. A solid particle flow distribution controller as recited in claim 1, wherein each extension plate is operatively connected to an actuator for moving the extension plate, wherein the actuator is selected from the group consisting of a manual actuator, an electrical actuator, a pneumatic actuator, and a hydraulic actuator.

4. A solid particle flow distribution controller as recited in claim 1, further comprising:
   a coal classifier having an inlet and a discharge skirt having a plurality of outlets, wherein the division plates are mounted within the interior of the discharge skirt proximate an upstream portion of the plurality of outlets, wherein the extension plates are radially inward of the discharge skirt and are configured and adapted for motion in the upstream and downstream direction independent of one another to extend upstream of their respective division plates to improve coal particle distribution between the outlets of the discharge skirt.

5. A solid particle flow distribution controller as recited in claim 4, wherein the discharge skirt has an interior divided into a plurality of circumferentially segmented chambers by the division plates mounted within the discharge skirt for dividing flow from the inlet to a plurality of outlet pipes downstream of the coal classifier, wherein the extension plates are configured and adapted for motion in the upstream and downstream direction independent of one another to extend upstream of their respective division plates to improve coal particle distribution between the chambers of the discharge skirt.

6. A solid particle flow distribution controller as recited in claim 4, further comprising a feed pipe extending through the coal classifier along a centerline thereof.

7. A solid particle flow distribution controller as recited in claim 4, further comprising a center pipe mounted within the classifier for control of an adjustable return baffle for prevention of reverse air flow through the classifier or re-entrainment of coarse particles.

* * * * *